(12) United States Patent
Kanai

(10) Patent No.: US 7,933,526 B2
(45) Date of Patent: Apr. 26, 2011

(54) IMAGE FORMING APPARATUS AND IMAGE FORMING METHOD WITH FORMS FOR PRINTING ACCORDING TO CONSUMABLE MATERIAL

(75) Inventor: Yasunori Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/958,221

(22) Filed: Dec. 17, 2007

(65) Prior Publication Data

US 2008/0166137 A1 Jul. 10, 2008

(30) Foreign Application Priority Data

Jan. 5, 2007 (JP) ................................. 2007-000787

(51) Int. Cl.
*G03G 15/00* (2006.01)

(52) U.S. Cl. ................. 399/12; 399/13; 399/40; 399/54; 399/81; 399/231

(58) Field of Classification Search ............... 399/12–13, 399/40, 54, 81, 231
See application file for complete search history.

(56) References Cited

U.S. PATENT DOCUMENTS 4,987,447 A * 1/1991 Ojha ............................... 399/84
2006/0222378 A1 * 10/2006 Julien ............................... 399/2
* cited by examiner

*Primary Examiner* — Ryan D Walsh
(74) *Attorney, Agent, or Firm* — Canon U.S.A., Inc., IP Division

(57) ABSTRACT

An image forming apparatus acquires a type of consumable material possessed by the image forming apparatus using a library provided in an application platform, displays forms capable of printing using the type of consumable material acquired, and forms an image using one or more forms designated from among the displayed forms.

13 Claims, 20 Drawing Sheets

IMAGE OVERPRINTING: SELECT FORM (FRONT)

SELECT FORM TO BE OVERPRINTED

| TYPE | NAME |
|---|---|
| ☐ | FORM IMAGE 1 (GRAYSCALE) |
| α | α COMPANY LOGO 1 (SPOT COLOR) |
| α | α COMPANY LOGO 2 (SPOT COLOR) |
| α | α COMPANY LOGO 3 (SPOT COLOR) |

◀ 1/1 ▶

CHECK COPY ☐

DETAILS ☐

CLEAR SETTINGS

BACK | NEXT

SYSTEM STATUS/TERMINATE

FIG. 18

IMAGE OVERPRINTING: SELECT FORM (FRONT)

SELECT FORM TO BE OVERPRINTED

| TYPE | NAME |
|---|---|
| ☐ | FORM IMAGE 1 (GRAYSCALE) |
| ∨ | GLOSSY (100%) |
| ∨ | GLOSSY (50%) |
| ∨ | GLOSSY (20%) |

◀ 1/1 ▶

CHECK COPY ▲

DETAILS ▲

CLEAR SETTINGS | ▼ BACK | ▲ NEXT

SYSTEM STATUS/TERMINATE ▲

IMAGE FORMING APPARATUS AND IMAGE FORMING METHOD WITH FORMS FOR PRINTING ACCORDING TO CONSUMABLE MATERIAL

BACKGROUND OF THE INVENTION

1. Field of the Invention

The present invention relates to an image forming apparatus including an application and an application platform, which is a control program for operating the application, and to an image forming method.

2. Description of the Related Art

The process color inks, or C (cyan), M (magenta), Y (yellow), and K (black) inks, are generally used in the analog printing industry. When certain colors that cannot be reproduced by the CMYK model, such as gold colors and silver colors, skin tones, pastel colors, corporate colors used by companies, and so on, are to be attractively and accurately reproduced, spot color inks, created by ink companies using unique formulas, can be used.

Meanwhile, in the digital printing industry, although printing using only CMYK toners was once mainstream, image forming apparatuses in which fifth and sixth toners can be installed have been seeing development in recent years. Hence, printing techniques that, like the analog printing industry, make use of spot color toners have come into demand.

However, PDL compliant with spot color toners, dedicated DTP applications, RIP controllers, and so on are necessary in order to print via a digital printer using spot color toners, and thus cannot be easily utilized by users. Note that "PDL" is an acronym of "Page Description Language", "DTP" is an acronym of "Desk Top Publishing", and "RIP" is an acronym of "Raster Image Processor".

Furthermore, a rendering method compliant with spot color toners, which are not CMY halftone toners, has yet to be established.

SUMMARY OF THE INVENTION

An embodiment of the present invention is directed to an image forming apparatus that can enable a user to carry out image forming with ease through an expansion function that uses a specific toner (e.g., spot color toner, glossy toner, transparent toner).

According to one aspect of the present invention, there is provided an image forming apparatus including a form application and an application platform installed in an operating system, the application platform being a control program that allows the form application to operate. The apparatus comprises: an acquisition unit adapted to acquire a type of consumable material (e.g., spot color toner, glossy toner, transparent toner) possessed by the image forming apparatus using a library provided in the application platform; a display control unit adapted to display forms (e.g., form images) capable of printing using the type of consumable material acquired by the acquisition unit; a designation unit adapted to designate one or more forms from among the forms displayed by the display control unit; and an image forming unit adapted to form (e.g., print) an image using the one or more forms designated by the designation unit.

According to another aspect of the present invention, there is provided a method for an image forming apparatus including a form application and an application platform installed in an operating system, the application platform being a control program that allows the form application to operate. The method comprises: acquiring a type of consumable material (e.g., spot color toner, glossy toner, transparent toner) possessed by the image forming apparatus using a library provided in the application platform; displaying forms (e.g., form images) capable of printing using the type of consumable material acquired in the acquiring step; designating one or more forms from among the forms displayed in the displaying step; and forming (e.g., printing) an image using the one or more forms designated in the designating step.

Further features of the present invention will become apparent from the following description of exemplary embodiments (with reference to the attached drawings).

BRIEF DESCRIPTION OF THE DRAWINGS

FIG. 8 is a diagram illustrating an example of a form image registration screen used for registering a form image or a spot color form image.

FIG. 17 is a diagram illustrating a form image selection screen used when spot color toner of a corporate color has been detected.

FIG. 18 is a diagram illustrating a form image selection screen used when glossy spot color toner has been detected.

DESCRIPTION OF THE EMBODIMENTS

Preferred embodiments for carrying out the present invention shall be described in detail hereinafter with reference to the drawings. Note that in the embodiments of the present invention, descriptions shall be given using a multi-function peripheral (MFP) as an example of an image forming apparatus. Furthermore, the image forming apparatus is assumed to include a plurality of applications and an application platform, which is a control program for operating the applications. Images are formed using toner, which is a consumable material, using a library provided in the application platform.

[Block Diagram of Hardware of MFP 100]

Figure 1:
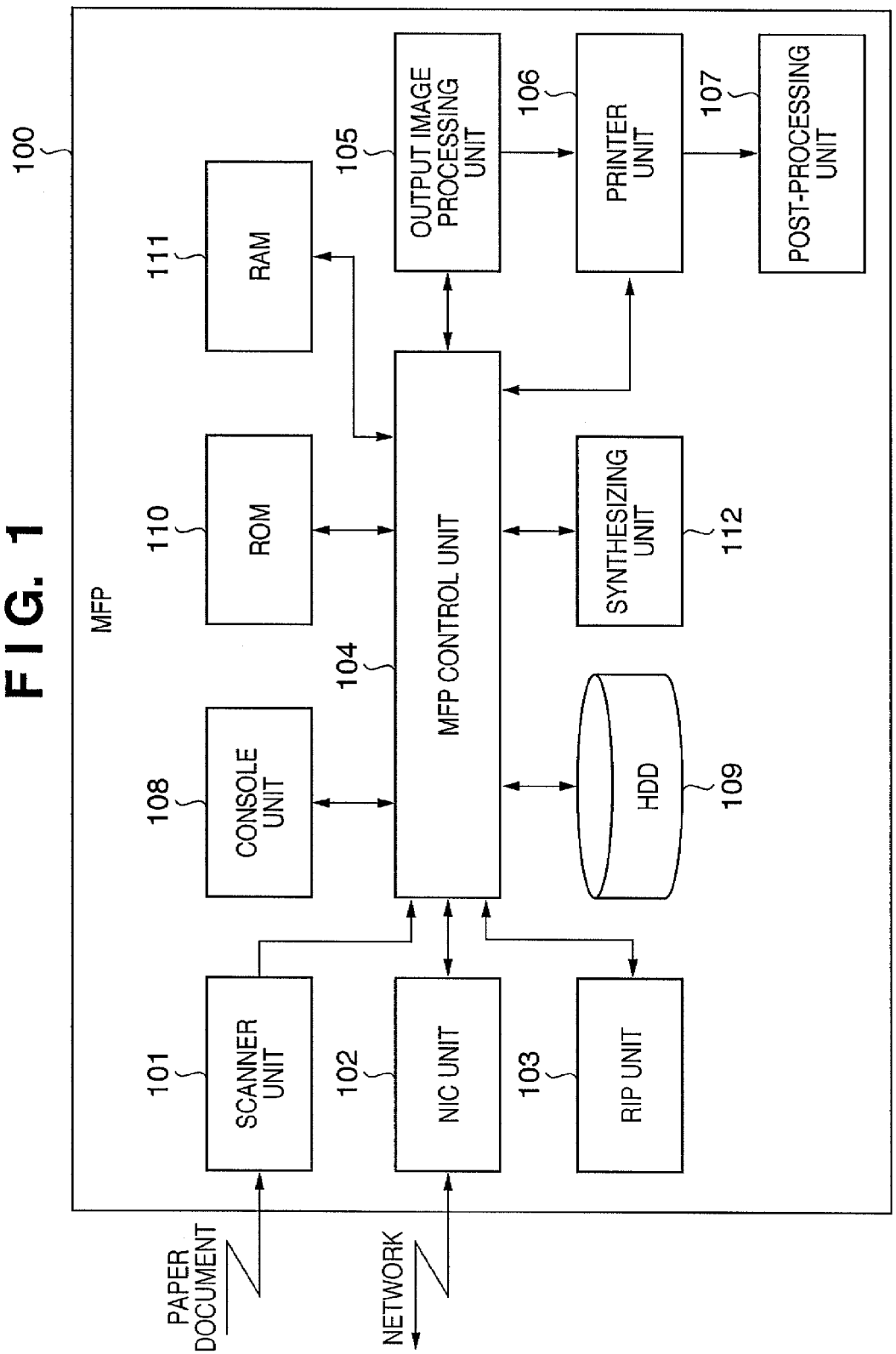
FIG. 1 is a diagram illustrating an example of a hardware configuration of an MFP according to the embodiments of the present invention.

FIG. 1 is a diagram illustrating an example of a hardware configuration of the MFP according to the embodiments of the present invention. In FIG. 1, a scanner unit 101 scans a paper document using a scanner, and performs image processing on the scanned image data. An NIC (Network Interface Card) unit 102 passes image data (mainly PDL data), inputted over a network, to an RIP unit 103, via an MFP control unit 104. Or, the NIC unit 102 sends image data and device settings for the internal components of the MFP 100 to the exterior over the network. The RIP unit 103 is a constituent element that decodes the inputted PDL data and expands it into a bitmap raster image.

The MFP control unit 104 performs overall control of processing, operations, and so on of the various units provided in the MFP 100. A ROM 110 is a read-only memory, in which programs such as boot sequences, font information, and programs for controlling the various units provided in the MFP 100 are already stored. A RAM 111 is a readable and writable memory, in which is stored image data sent from the scanner unit 101, NIC unit 102, RIP unit 103, and so on via the MFP control unit 104, as well as various programs.

An HDD 109 is a high-capacity storage device that stores image data such as bitmap images and so on expanded by the RIP unit 103. The stored image data is stored temporarily, or retrieved as necessary. A synthesizing unit 112 performs processing for selecting two pieces of image data from the image data stored in advance in the HDD 109, the image data scanned by the scanner unit 101, and so on, and synthesizes the two in order to create a single piece of image data. The synthesized image data is stored in the HDD 109.

An output image processing unit 105 performs image processing for printing, and sends the resultant to a printer unit 106. The printer unit 106 supplies a sheet of paper, and sequentially prints, onto the sheet of paper, the image data processed by the output image processing unit 105. The printed-out sheet of paper is sent to a post-processing unit 107, which performs post-processing, such as sheet sorting processing, sheet finishing processing, and so on.

A console unit 108 is used for selecting various processing flows and functions, instructing operations, and so on, such as those described above; however, due to an increase in the resolution of display units used in console units, the console unit 108 can also be used to preview image data in the HDD 109 and print the image data after confirming the preview.

Accordingly, the MFP 100 has a variety of functions and usage methods, examples of which are provided below.

(A) Copying function: scanner unit→output image processing unit→printer unit
(B) Network scanning: scanner unit→NIC unit
(C) Network printing: NIC unit→RIP unit→output image processing unit→printer unit
(D) Box scanning function: scanner unit→output image processing unit→HDD
(E) Box printing function: memory unit→printer unit
(F) Box receiving function: NIC unit→RIP unit→output image processing unit→HDD
(G) Box sending function: memory unit→HDD
(H) Preview function: memory unit→console unit
(I) Synthesizing function: HDD→synthesizing unit→HDD

[Block Diagram of Software of MFP 100]

Next, a software configuration of the MFP 100 shall be described with reference to FIG. 2. This software is stored in the ROM 110 in advance, and programs thereof are interpreted and processed by the MFP control unit 104.

Figure 2:
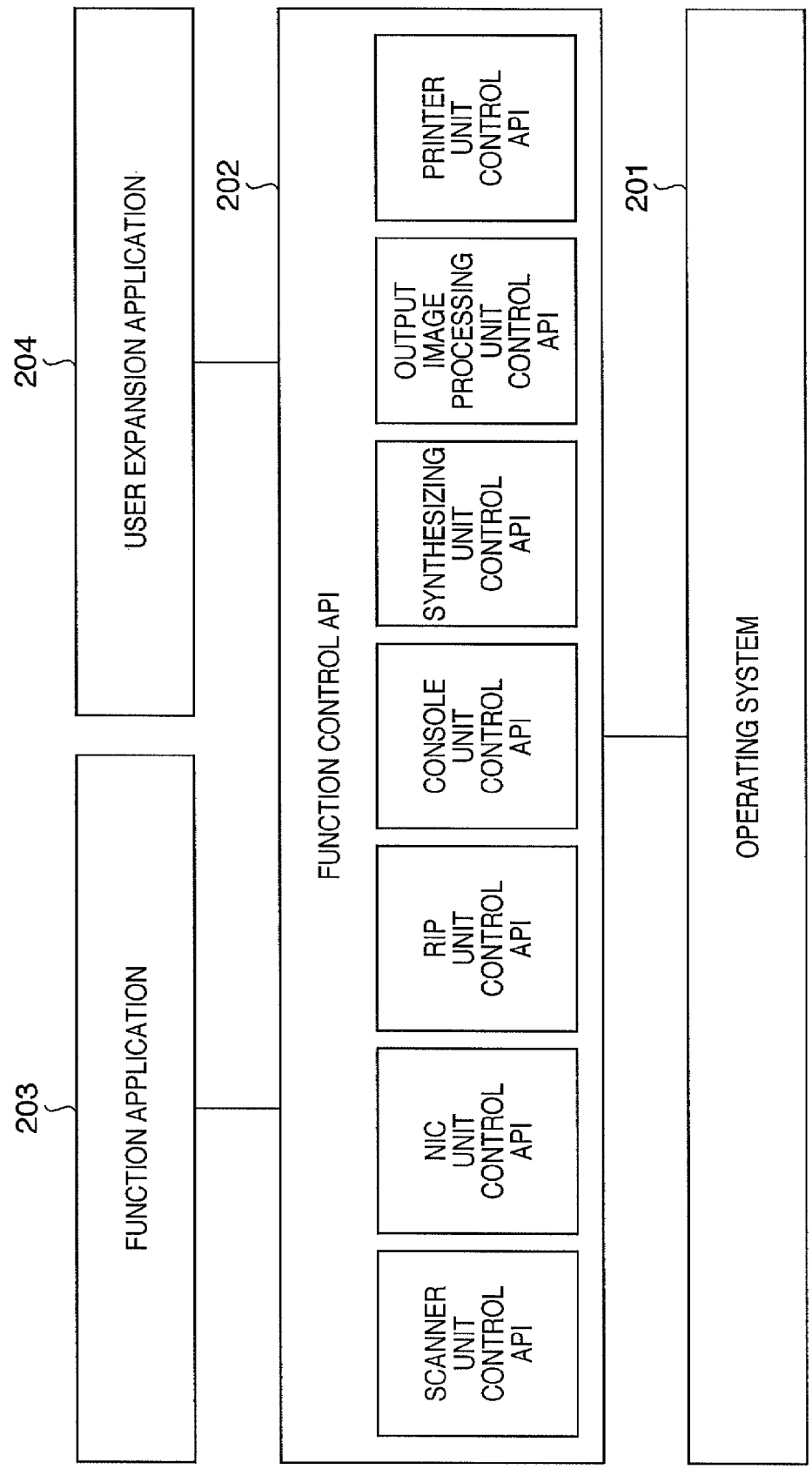
FIG. 2 is a diagram illustrating an example of a software configuration of an MFP 100 according to the embodiments of the present invention.

FIG. 2 is a diagram illustrating an example of a software configuration of an MFP 100 according to the embodiments of the present invention. In FIG. 2, an operating system (OS) 201 performs overall control of the basic data input/output within the MFP 100. A function control API (Application Program Interface) 202 controls various functions that run in the MFP 100.

The function control API 202 comprises a scanner unit control API, an NIC unit control API, an RIP unit control API, a console unit control API, a synthesizing unit control API, an output image processing unit control API, a printer unit control API, and so on.

A function application 203 comprises various applications that implement the functions of the MFP 100, and is an application that is standard in the MFP 100. Representative examples of this function application 203 are the functions listed under (A) through (I) above.

A user expansion application 204 can be installed dynamically by a user in the MFP 100, and is an application through which the functions of the MFP 100 can be expanded. Note that installation is performed via the NIC unit 102 using a personal computer (PC) (not shown).

[Hardware Configuration of 1D Color-Type MFP 100]

Figure 3:
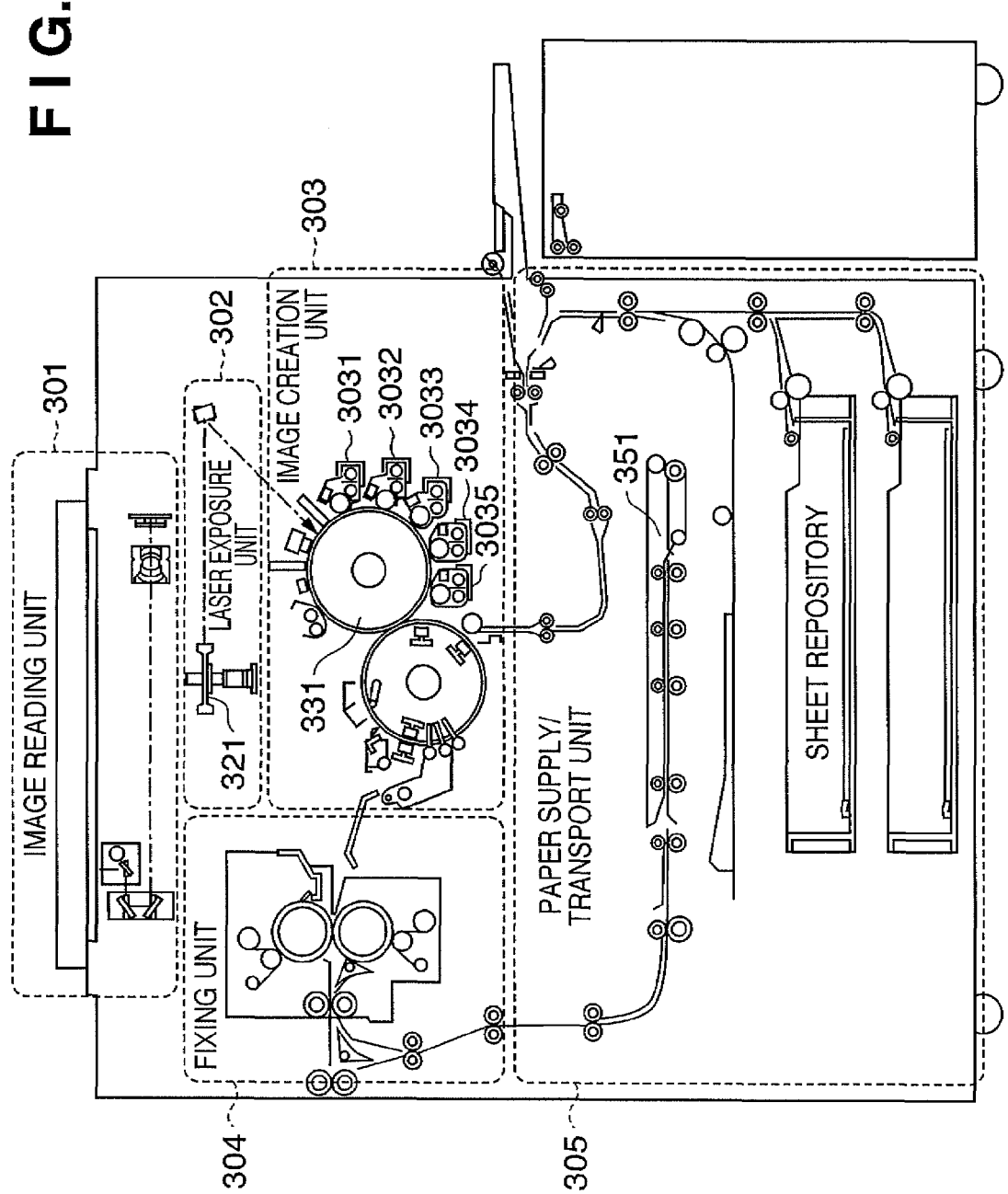
FIG. 3 is a diagram illustrating an example of a hardware configuration of a 1D color-type MFP 100 according to the embodiments of the present invention.

Next, a hardware configuration of a 1D color-type MFP 100 shall be described with reference to FIG. 3. FIG. 3 is a diagram illustrating an example of a hardware configuration of a 1D color-type MFP 100 according to the embodiments of the present invention. The 1D color-type MFP 100 is configured of an image reading unit 301, a laser exposure unit 302, an image creation unit 303, a fixing unit 304, and a paper supply/transport unit 305. These units are controlled by the scanner unit 101, printer unit 106, and so on in accordance with the above mentioned functions.

The image reading unit 301 applies illumination to a document placed on a document glass and optically reads an image of the document; this image is converted into an electric signal, thereby creating image data. The laser exposure unit 302 causes a beam of laser light or the like modulated in accordance with the image data to enter into a rotating polygon mirror 321 rotating at an isometric speed, which is irradiated as reflected scanning light onto a photosensitive drum 331.

The image creation unit 303 rotationally drives the photosensitive drum 331 and applies an electrostatic charge thereto using an electrifier, and develops a latent image formed upon the photosensitive drum 331 by the laser exposure unit 302 using toner. Then, the toner image is transferred to a sheet of paper, and the minute toner that was not transferred and remains upon the photosensitive drum 331 is collected. When executing this series of electric photographic processes and creating an image, the sheet is wrapped around a transfer belt in a predetermined position, and developing units (developing stations) 3031 to 3035 take turns sequentially repeating these electric photographic processes during the rotation.

Here, the developing units 3031 to 3035 have magenta (M), cyan (C), yellow (Y), and black (K) toners, as well as a fifth toner. Following the rotation of the developing units, a sheet onto which a full-color toner image has been transferred leaves a transfer drum and is transported to the fixing unit 304.

The fixing unit 304 is configured of a combination of rollers, belts, and the like, and includes a heat source such as a halogen heater or the like. Using heat and pressure, the fixing unit 304 fuses and fixes the toner on the sheet, to which the toner image has been transferred by the image creation unit 303.

The paper supply/transport unit 305 comprises at least one sheet repository, such as a sheet cassette or a paper drawer. In response to an instruction from the printer unit 106, the paper supply/transport unit 305 separates a single sheet from a plurality of sheets stored in the sheet repository and transports that sheet to the image creation unit 303 and the fixing unit 304. The sheet is wrapped around the transfer drum of the image creation unit 303 and is transported to the fixing unit 304 after four rotations. The abovementioned YMCK-color toner image is transferred to the sheet during these four rotations. In the case where the image is to be formed on both sides of the sheet, control is performed so that the sheet that has passed through the fixing unit 304 also passes through a double-sided transport path 351 that transports the sheet to the image creation unit 303 a second time.

The printer unit 106 communicates with the MFP control unit 104, which performs overall control of the MFP 100, and executes control in response to instructions therefrom. The printer unit 106 also manages the statuses of the abovementioned scanner, laser exposure, image creation, fixing, and paper supply/transport units, and issues instructions so that the units can operate smoothly while maintaining harmony with one another.

[Printer Unit 106 Operations]

Next, operations of the printer unit 106 shall be described. First, when the power is turned on from an off state, the printer unit 106 instructs the image reading unit 301, laser exposure unit 302, image creation unit 303, fixing unit 304, and paper supply/transport unit 305 to commence preparation operations. The printer unit 106 then waits for communication with the MFP control unit 104, which manages the entire MFP 100, to commence.

When communication with the MFP control unit 104 is established, the two devices exchange their specifications. After this, when the preparation operations of each of the units finish, and image forming operations become possible, the printer unit 106 notifies the MFP control unit 104 that it is in an operable state.

Here, the printer unit 106 notifies the MFP control unit 104 of the device statuses of each of the constituent units. Specifically, the printer unit 106 detects the size of the sheets stored in the repository of the paper supply/transport unit 305, the amount (load) of sheets stored in the repository, the operation status of the driving units (whether they are operable or have broken down), and notifies the MFP control unit 104 of this information. The printer unit 106 also notifies the MFP control unit 104 of the amount of toner stored in the toner storage containers in the developing units 3031 to 3035 of the image creation unit 303.

Next, an outline of the operations of the constituent units when executing a series of printing operations after being notified by the MFP control unit 104 of operation instructions shall be explained, assuming that the device is in a state capable of commencing operations. First, the MFP control unit 104 communicates an operation start command to the printer unit 106. Having received the operation start command, the printer unit 106 instructs the laser exposure unit 302, image creation unit 303, paper supply/transport unit 305, and fixing unit 304 to commence print operations.

In response to the print operation instruction received from the printer unit 106, the laser exposure unit 302 causes a motor driving the polygon mirror 321 (a polygon motor) to rotate. The image creation unit 303 rotationally drives the photosensitive drum 331, and applies an electrostatic charge thereto. The fixing unit 304 activates the fixing heater and raises the temperature to where the toner on the sheet can be fixed to the sheet. Then, the paper supply/transport unit 305 puts its driving means (motor) in a state capable of transporting sheets.

Then, once operation preparations are complete for each of the units, the printer unit 106 notifies the MFP control unit 104 that the preparations are complete. Upon receiving the preparation completion notification from the printer unit 106, the MFP control unit 104 then instructs printing operations to be performed on a page-by-page basis. The MFP control unit 104 instructs printing operations to be performed for, for example, 200 pages for a print job that requires 20 sets of 10 pages to be printed. Upon receiving the printing operation instruction, the printer unit 106 instructs the paper supply/transport unit 305 to supply paper. If it is possible for sheets to be supplied, the paper supply/transport unit 305 supplies and transports a single sheet of paper, and notifies the printer unit 106 that the sheet has arrived at a predetermined position when that sheet arrives at the predetermined position.

Note that if it is not possible for sheets to be supplied, such as in the case where there are no sheets in the repository, the printer unit 106 is notified that it is not possible for sheets to be supplied. In addition, the paper supply/transport unit 305 is provided with a multiple feed detection sensor for detecting a state in which sheets are stacked upon one another in the transport path (a multiple feed state), a thickness detection sensor for detecting the thickness of the sheets, and so on. When these sensors detect a multiple feed, an abnormal state, or the like, the paper supply/transport unit 305 interrupts the paper supply and transport operations and notifies the printer unit 106 of the abnormality. In such a case, the printer unit 106 notifies the MFP control unit 104 of the reason for interrupting operations, the position of sheets left inside the device, and so on.

However, if the sheets have been correctly transported and have arrived in the predetermined position, the printer unit 106 instructs the image creation unit 303 to commence image creation in accordance with a sheet predetermined position arrival notification from the paper supply/transport unit 305. A toner image is transferred onto the sheet based on this timing control.

Furthermore, although the fixing unit 304 monitors the temperature of the fixing unit 304 and controls the fixing unit 304 to achieve an appropriate temperature for fixing, there are cases where the temperature of the fixing unit 304 drops if the sheet has picked up a significant amount of heat from the fixing unit 304. In this case, the fixing unit 304 notifies the printer unit 106 that the temperature of the fixing unit 304 has dropped; upon receiving this notification, the printer unit 106 increases the interval between sheet transports to ensure that the temperature of the fixing unit 304 does not drop any further. In the case where the temperature of the fixing unit 304 does not return to normal, operations are controlled to be temporarily stopped and resumed once again after the temperature has returned to normal.

After this, when all sheets have been ejected, the printer unit 106 instructs the various units to stop operations, and upon receiving an operation stop notification from the units, notifies the MFP control unit 104 that the operations have been completed.

[Console Unit 108 Configuration]

Next, the configuration of the console unit 108, which functions as the user interface of the MFP 100, shall be described with reference to FIGS. 4 through 6.

Figure 4:
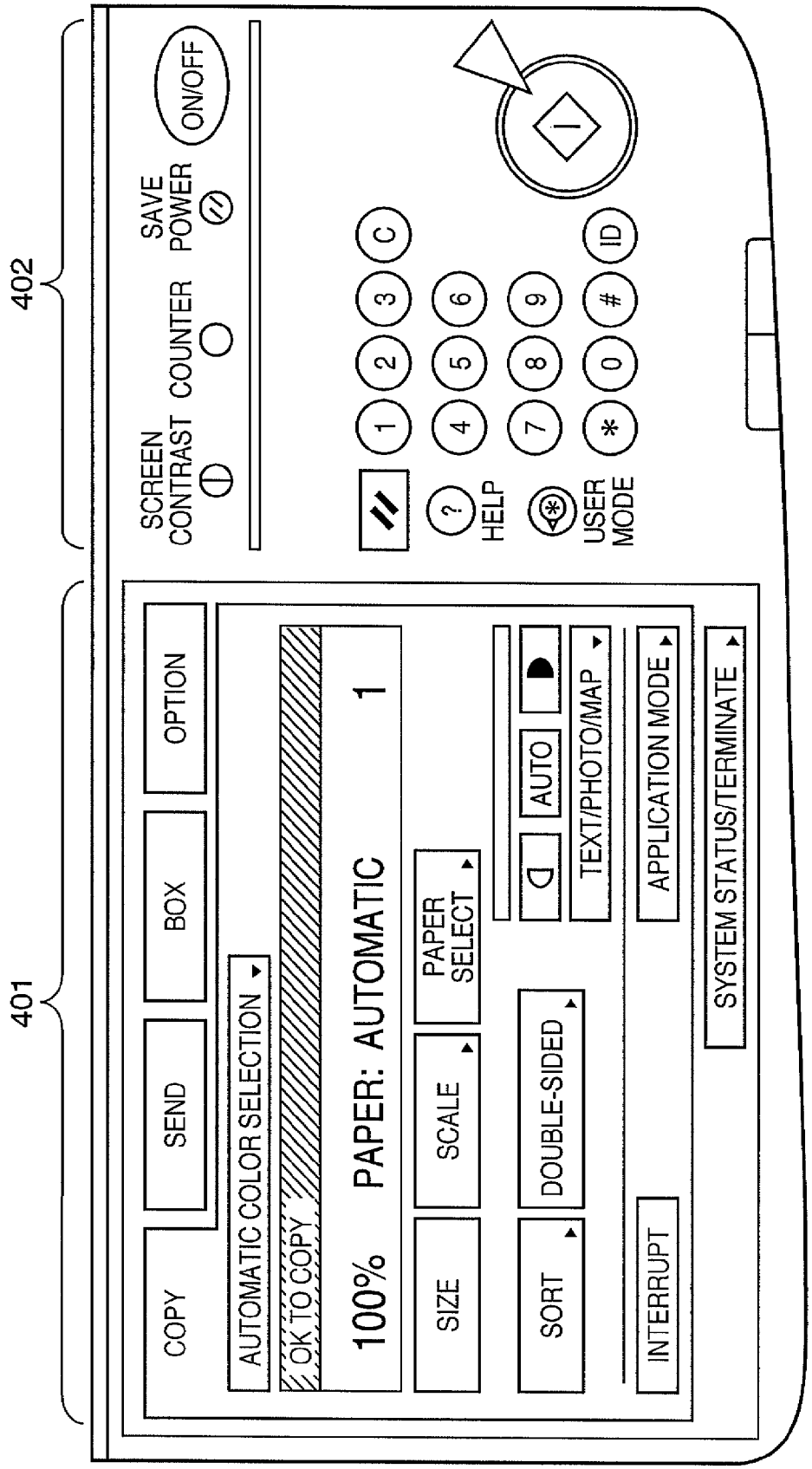
FIG. 4 is a diagram illustrating an example of the configuration of a console unit 108 according to the embodiments of the present invention.

FIG. 4 is a diagram illustrating an example of the configuration of the console unit 108 according to the embodiments of the present invention. As shown in FIG. 4, the console unit 108 is configured of a key input unit 402 and a touch panel unit 401.

Figure 5:
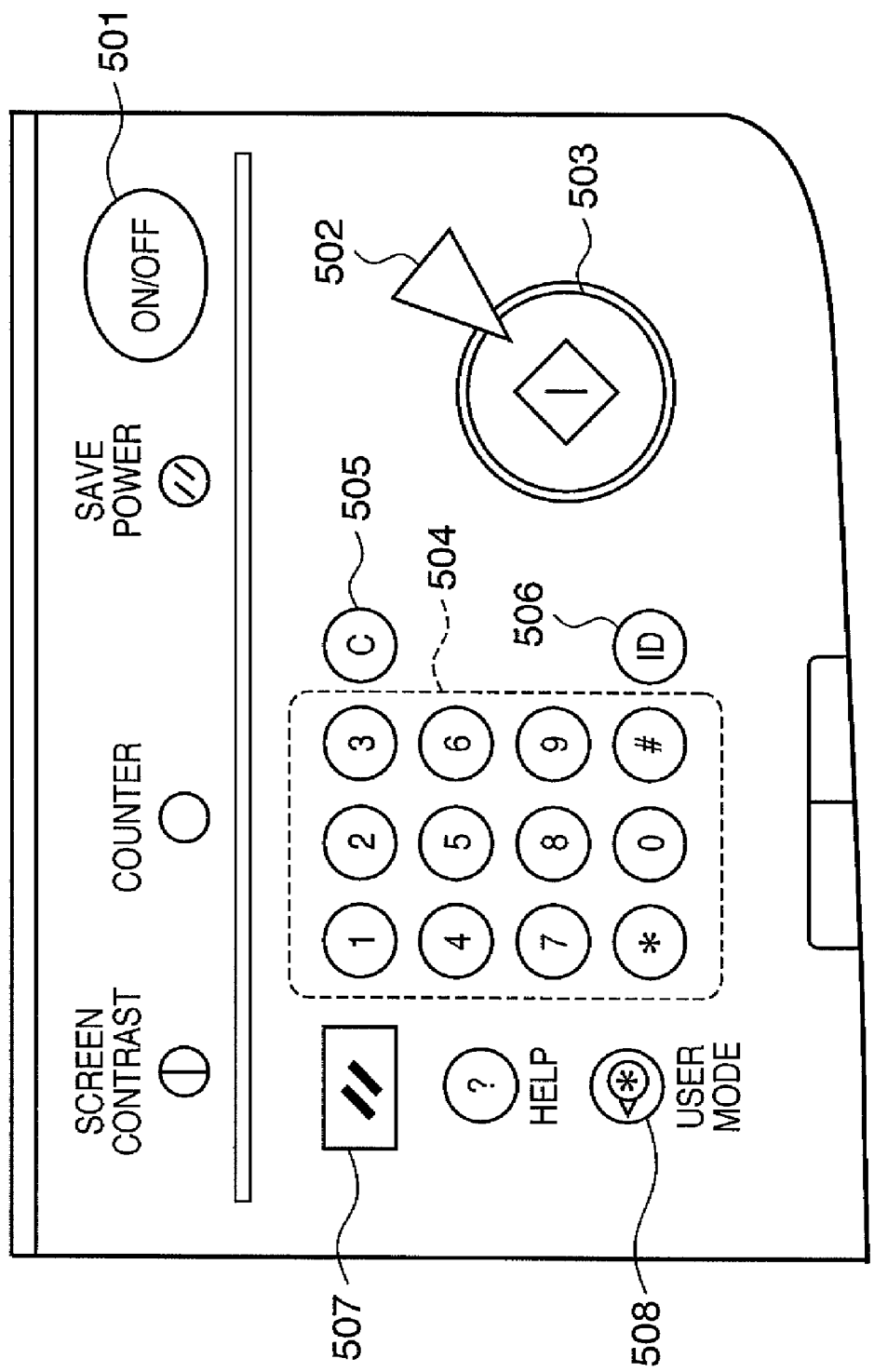
FIG. 5 is a diagram illustrating an example of the configuration of a key input unit 402, through which routine operational settings can be made.

FIG. 5 is a diagram illustrating an example of the configuration of the key input unit 402, through which routine operational settings can be made. A console unit power switch 501, shown in FIG. 5, serves to switch between a standby mode and a sleep mode, and can be controlled when a main power switch, which supplies power to the device as a whole, is on. Note that standby mode refers to the normal operating mode, whereas sleep mode refers to a state where the main controller enters a state in which it waits in preparation for network printing or facsimile interrupts, stopping programs and thereby reducing power consumption.

A start key 502 is a key that instructs copying, sending, or the like to be commenced, whereas a stop key 503 is a key for stopping such operations. A numerical keypad 504 consists of keys used for entering numbers for various settings, and a clear key 505 is a key for clearing the entered numbers.

An ID key 506 is a key that allows a pre-set passkey to be inputted for the purpose of identifying the operator of the MFP 100. A reset key 507 is a key for canceling various settings and returning the device to its default state. A user mode key 508 is a key for moving among system setting screens for each user.

Figure 6:
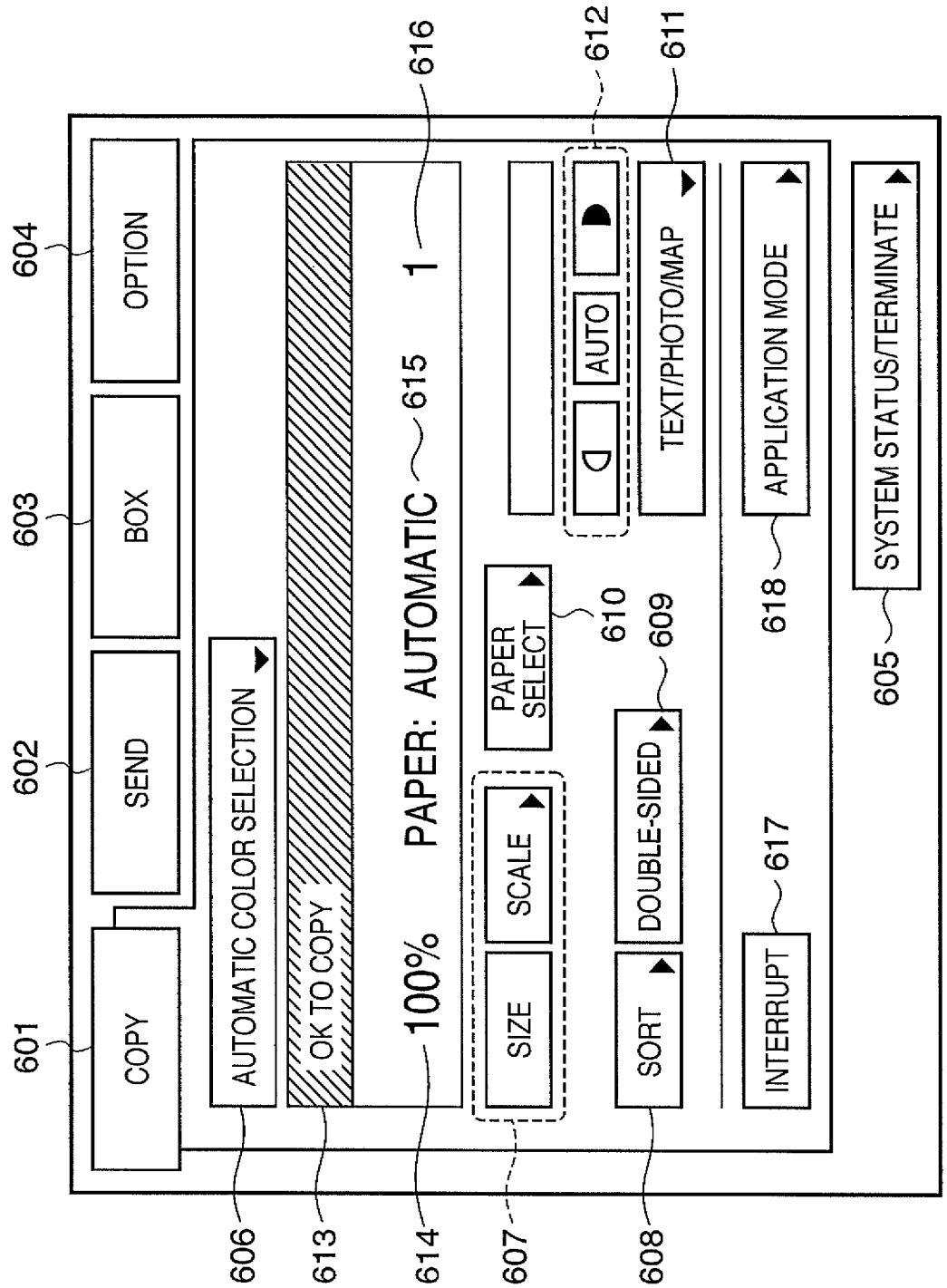
FIG. 6 is a schematic view of a touch panel display made up of a liquid-crystal display (LCD) and a transparent electrode applied thereupon.

Next, FIG. 6 is a schematic view of a touch panel display made up of a liquid-crystal display (LCD) and a transparent electrode applied thereupon. The touch panel is pre-programmed to detect when portions of the transparent electrode that represent keys displayed on the LCD are touched with a finger, and display a different operational screen in response thereto. The example illustrated in FIG. 6 represents an initial screen when in standby mode; various setting screens can be displayed in response to setting operations being performed.

In FIG. 6, a copy tab 601 is a tab key for transiting to an operational screen for copy operations. A send tab 602 is a tab key for transiting to an operational screen for instructing sending operations, such as fax and e-mail sending. A box tab 603 is a tab key for transiting to a screen for performing operations for inputting/outputting jobs to a box (a storage means that stores jobs on a user-by-user basis). An option tab 604 is a tab key for performing expansion function settings, such as scanner settings. A system monitor key 605 is a key for displaying the state or status of the MFP 100. By selecting each of the tabs, it is possible to transit to the respective operational modes.

A color selection setting key 606 is a key for selecting, in advance, whether to produce color copies, grayscale copies, or automatically select one or the other. A scale setting key 607 is a key for transiting to a screen for performing scaling settings such as enlarging, shrinking, or using the same size. A post-processing key 608 is a key for transiting to a screen for setting whether or not to use staples, whether or not to punch holes in the copies, how many staples/holes to be made, the position of the staples/holes, and so on. A double-sided setting key 609 is a key for transiting to a screen for selecting whether to print on one side only or on both sides of a sheet.

A paper size setting key 610 is a key for transiting to a screen for selecting the supply tray, size of the paper, the media type, and so on. An image mode setting key 611 is a key for selecting an image mode appropriate for the original image, such as a text mode or a picture mode. A darkness setting key 612 is a key for adjusting the outputted image to be darker or lighter.

A status display area 613 is a display area for displaying the status of the device in a simplified manner, such as "standby", "warming up", "jam", "error", and so on. A scale display area 614 displays the scale set using the scale setting key 607. A paper size display area 615 displays the paper size, mode, and the like set using the paper size setting key 610. A copy number display area 616 displays the number of copies specified using the numerical keypad 504, what number copy is currently being printed while the device is operating, and so on.

An interrupt key 617 is pressed in the case where a different job is to be executed when copy operations are currently being carried out. An application mode key 618 is a key for transiting to a screen for performing settings for various image processes and layouts, such as two-page layouts, cover sheet/insert settings, reduced layouts, image movements, and so on.

First Embodiment

Processing undertaken to register a spot color form image or a normal form image using the abovementioned configuration shall be explained hereinafter with reference to FIGS. 7 through 10. It should be noted that the MFP 100 is assumed to have a form registration application as one of its function applications 203, as well as a spot color form registration expansion application capable of being used as a user expansion application 204.

Figure 7:
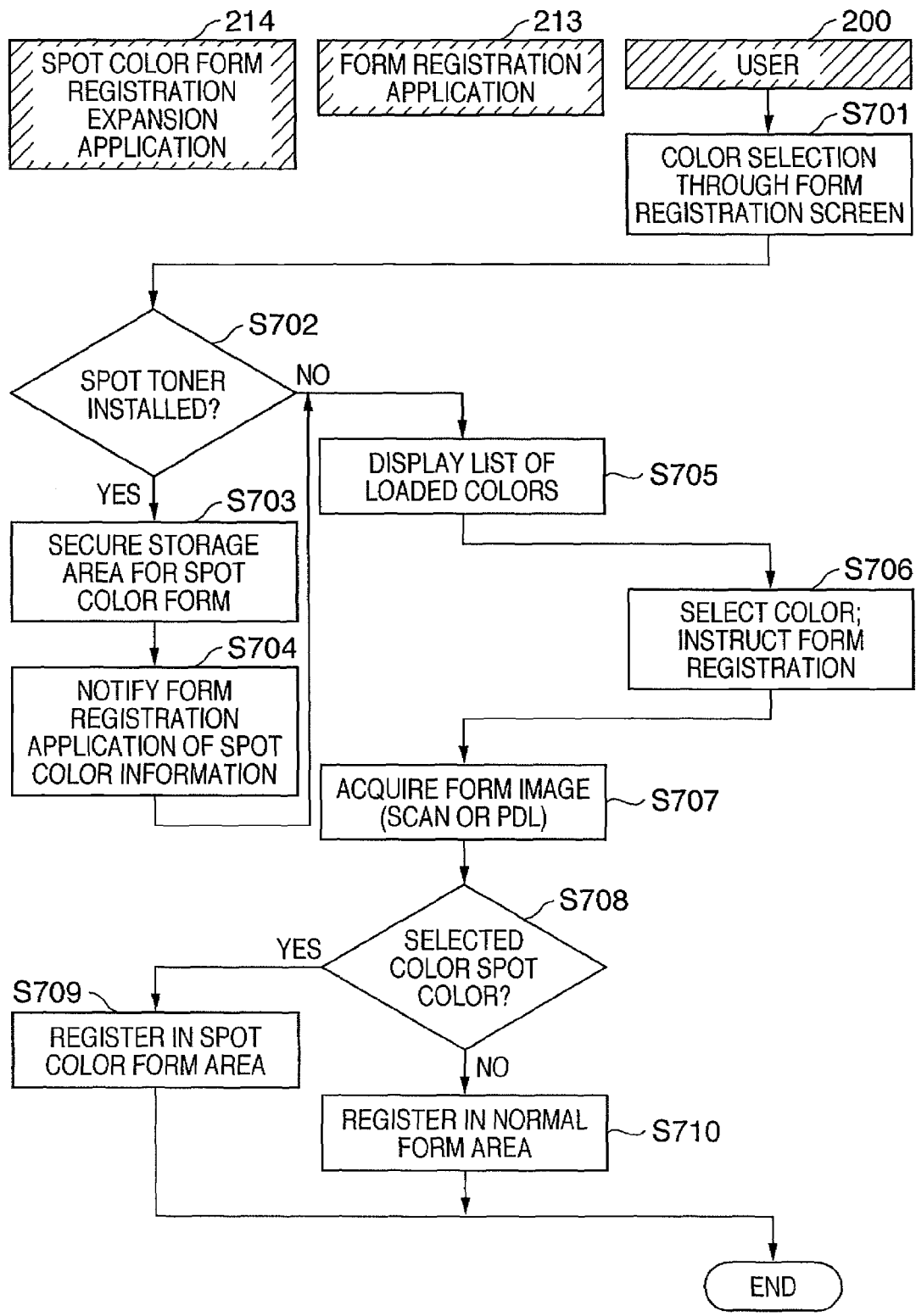
FIG. 7 is a flowchart illustrating a process for registering a spot color form image or a normal form image.
Figure 8:
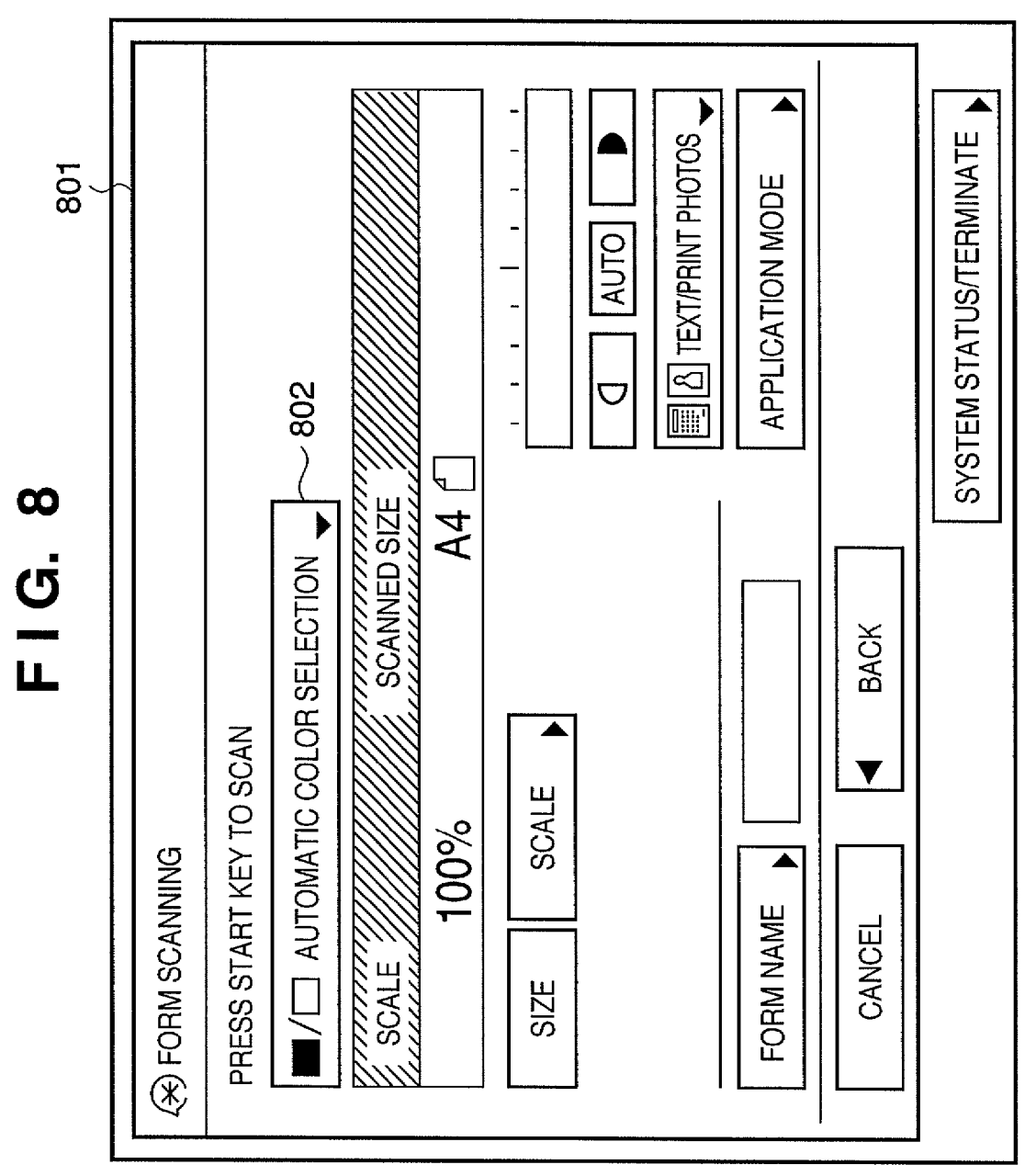

FIG. 7 is a flowchart illustrating a process for registering a spot color form image or a normal form image. After a user 200 presses the user mode key 508 on the console unit 108 of the MFP 100, s/he operates the touch panel unit 401, causing a form image registration screen 801 (FIG. 8), for registering a form image or a spot color form image, to be displayed. The example illustrated in FIG. 8 shows a case where the form image is scanned by the scanner unit 101 and registered; however, the registration method is not limited hereto, and registration via PDL is also possible.

Next, the user 200 presses a color selection key 802 in order to select the color of the form image to be registered (S701). Pressing the color selection key 802 results in a spot color form registration expansion application 214 inquiring with the printer unit 106 as to whether or not spot color toner is installed. In other words, the spot color form registration expansion application 214 uses the printer control unit API to call a function for inquiring as to the installation state of spot color toner.

In response to the inquiry request from the spot color form registration expansion application 214, the printer unit 106 checks with the developing units 3031 to 3035 regarding the installation status of spot color toner, and reports the results of the check. In the first embodiment, it is assumed that a developing unit provided with a corporate color toner for a specific company (Company α) in addition to CMYK toners is installed in the device.

Figure 9:
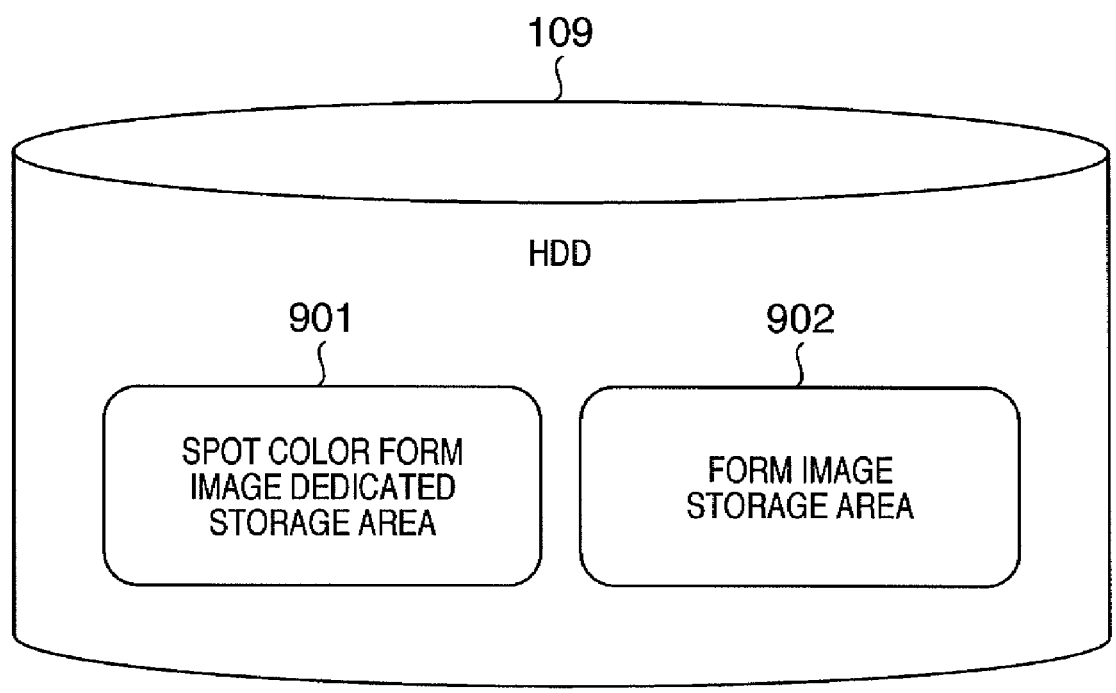
FIG. 9 is a diagram illustrating a spot color form image dedicated storage area, secured in an HDD.

Here, when the spot color form registration expansion application 214 detects that spot color toner is installed (Yes in S702), a spot color form image dedicated storage area 901 is secured in the HDD 109, as shown in FIG. 9 (S703). Then, the form registration application 213 is notified of spot color toner information in order to register the spot color form (S704).

Figure 10:
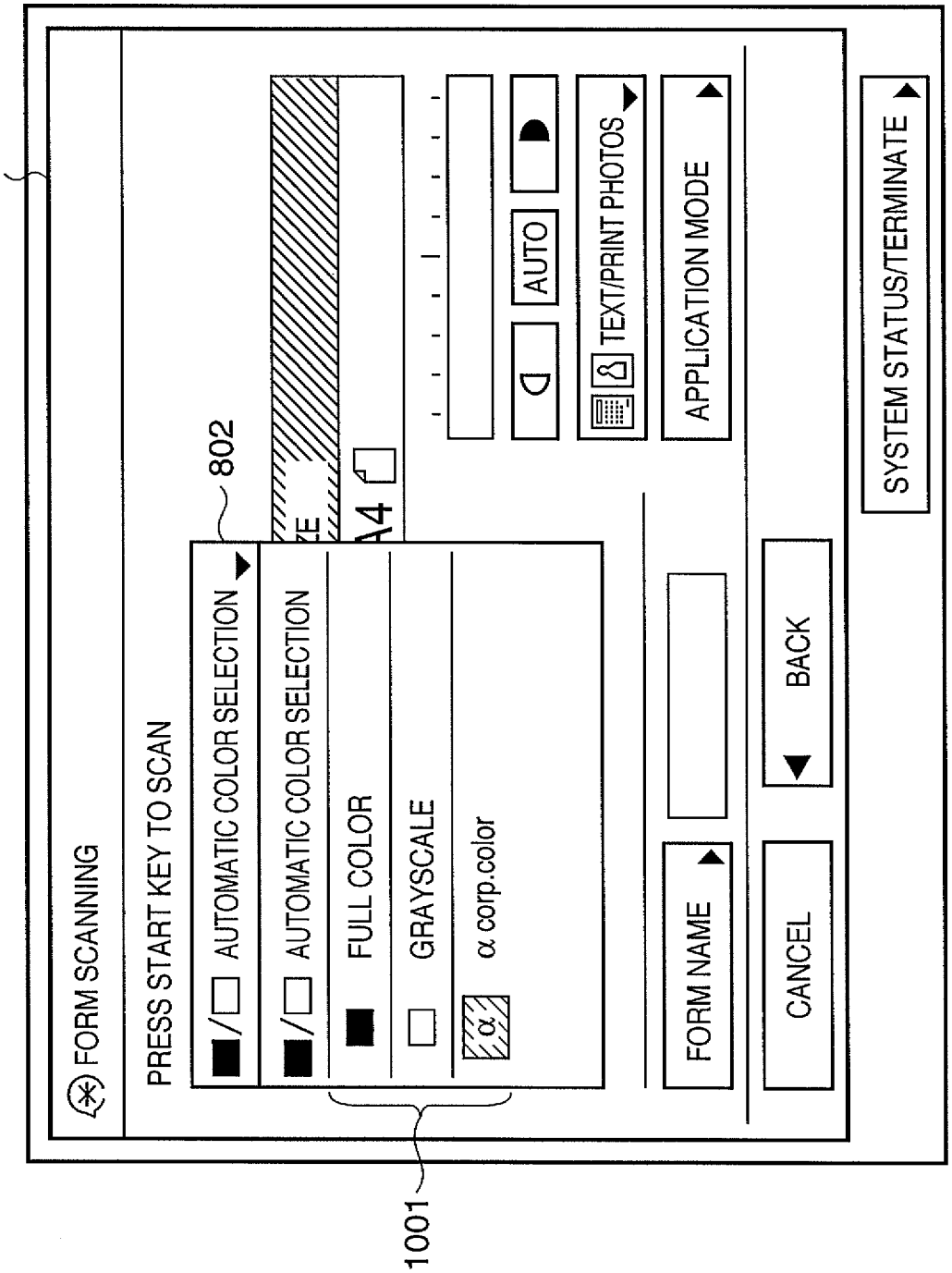
FIG. 10 is a diagram illustrating an example of a list display screen for selecting colors including spot color toner.

Upon receiving the notification of the spot color toner information, the form registration application 213 displays a list 1001 of color selections including the spot color toner, as shown in FIG. 10 (S705). Note that in the case where it has been detected that the spot color tone is not installed (No in S702), the spot color toner is not displayed in the list 1001 of color selections.

Next, the user 200 selects a desired color from the list 1001 of color selections, and instructs the execution of form registration (S706). In response to this instruction, the form registration application 213 acquires the form image (S707). More specifically, if the registration is performed using the scanner, the scanning is performed by the scanner unit 101, whereas if the registration is performed using PDL, the image is acquired by the NIC unit 102 and the RIP unit 103.

Next, it is determined whether or not the color selected by the user is a spot color (S708). Here, in the case where the selected color is a spot color (Yes in S708), the spot color form registration expansion application 214 registers the form image in the spot color form image dedicated storage area 901 of the HDD 109, as shown in FIG. 9 (S709). However, in the case where the selected color is not a spot color (No in S708), the form registration application 213 registers the form image in a form image storage area 902 of the HDD 109, as shown in FIG. 9 (S710).

Next, overprinting using a spot color form image or a normal form image shall be explained with reference to FIG. 11. It should be noted that the MFP 100 is assumed to have a form printing application 223 as one of its function applications 203, as well as a spot color form printing expansion application 224 capable of being used as a user expansion application 204.

Figure 11:
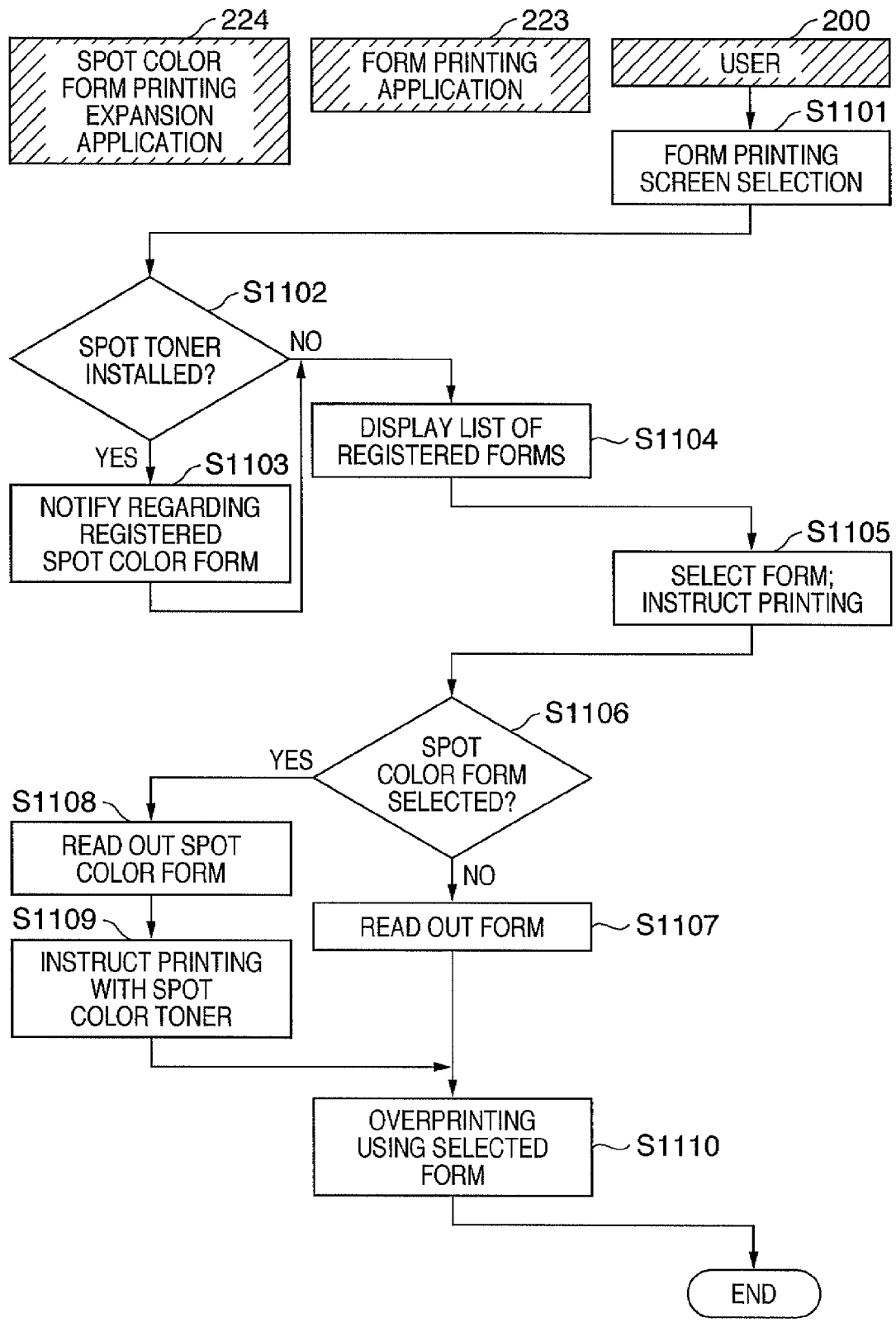
FIG. 11 is a flowchart illustrating a process for performing overprinting of a spot color form image or a normal form image.

FIG. 11 is a flowchart illustrating a process for performing overprinting of a spot color form image or a normal form image. After a user 200 presses the user mode key 508 on the console unit 108 of the MFP 100, s/he operates the touch panel unit 401, and selects a form overprinting screen 1201 (FIG. 12), for form overprinting (S1101).

This selection results in the spot color form printing expansion application 224 inquiring with the printer unit 106 as to whether or not spot color toner is installed (S1102). In response to the inquiry request from the spot color form printing expansion application 224, the printer unit 106 checks with the developing units 3031 to 3035 regarding the installation status of spot color toner, and reports the results of the check. In the first embodiment, it is assumed that a developing unit provided with a corporate color toner for a specific company (Company α) in addition to CMYK toners is installed in the device.

Here, when the spot color form printing expansion application 224 detects that spot color toner is installed (Yes in S1102), the form printing application 223 in notified of information regarding only the spot color form image already registered in the spot color form image dedicated storage area 901 (S1103).

Figure 12:
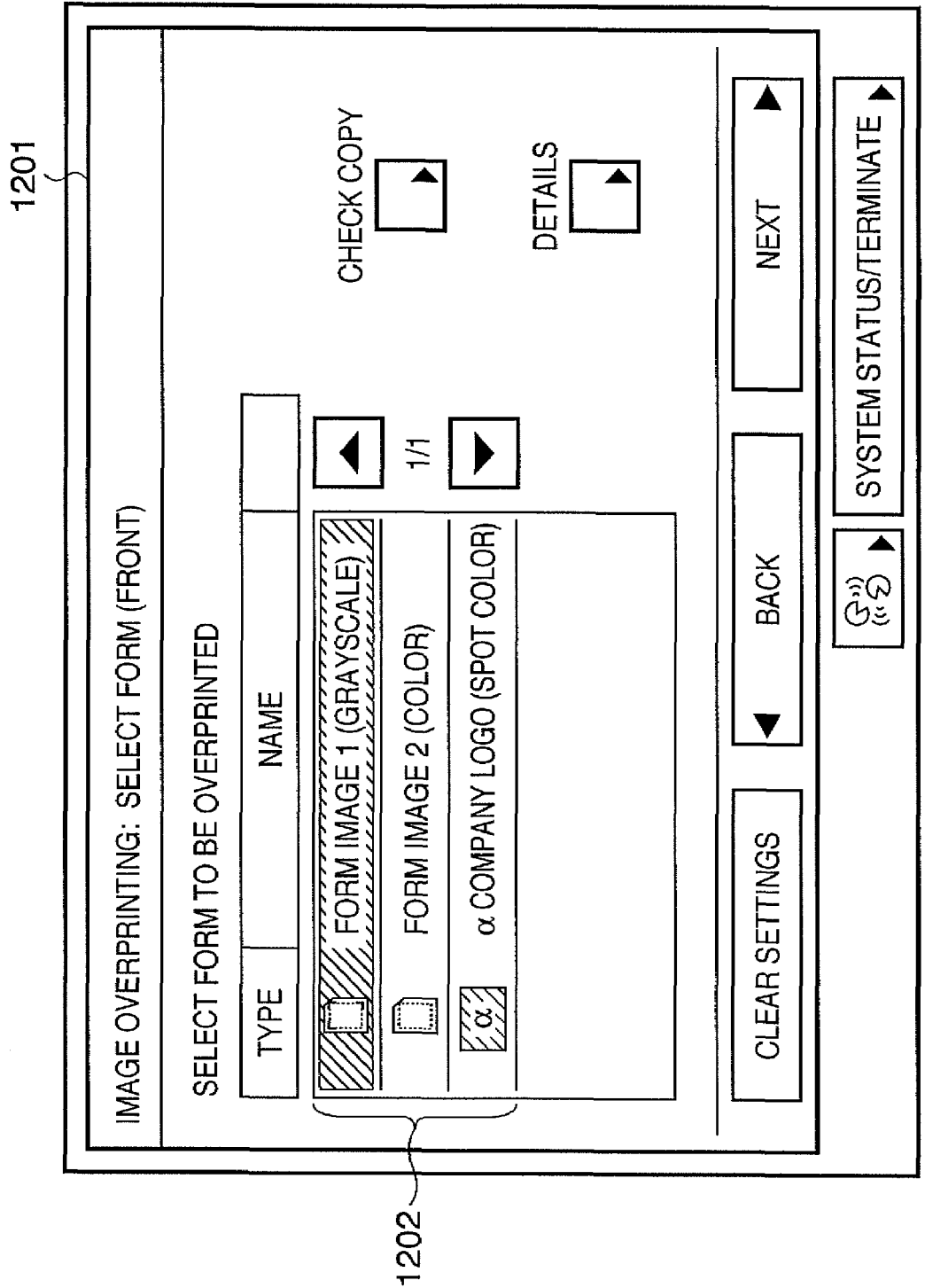
FIG. 12 is a diagram illustrating an example of a form-overprinting screen for performing form overprinting.

Upon receiving the notification of the spot color form image information, the form printing application 223 displays a list 1202 of already-registered form images, including the spot color form image, as candidates for selection, as shown in FIG. 12 (S1104). However, note that in the case where it is detected that spot color toner is not installed (No in S1102), the spot color form image is not displayed in the list 1202 of already-registered form images.

Next, the user 200 selects a desired form image from the list 1202 of already-registered form images, and instructs the execution of form overprinting (S1105). In response to this instruction, the form printing application 223 determines whether or not the selected form image is a spot color form image (S1106). Here, if the form image is a spot color form image (Yes in S1106), the spot color form printing expansion application 224 reads out the selected spot color form image from the spot color form image dedicated storage area 901 (S1108). Then, the form printing application 223 is instructed to perform form overprinting using the spot color toner (S1109).

Having received this instruction, the form printing application 223 carries out processing for overprinting the spot color form image on a print image, and via the MFP control unit 104, instructs the printer unit 106 to print the spot color form image portion using only the spot color toner. Form overprinting using spot color toner is carried out in this manner (S1110).

Figure 13:
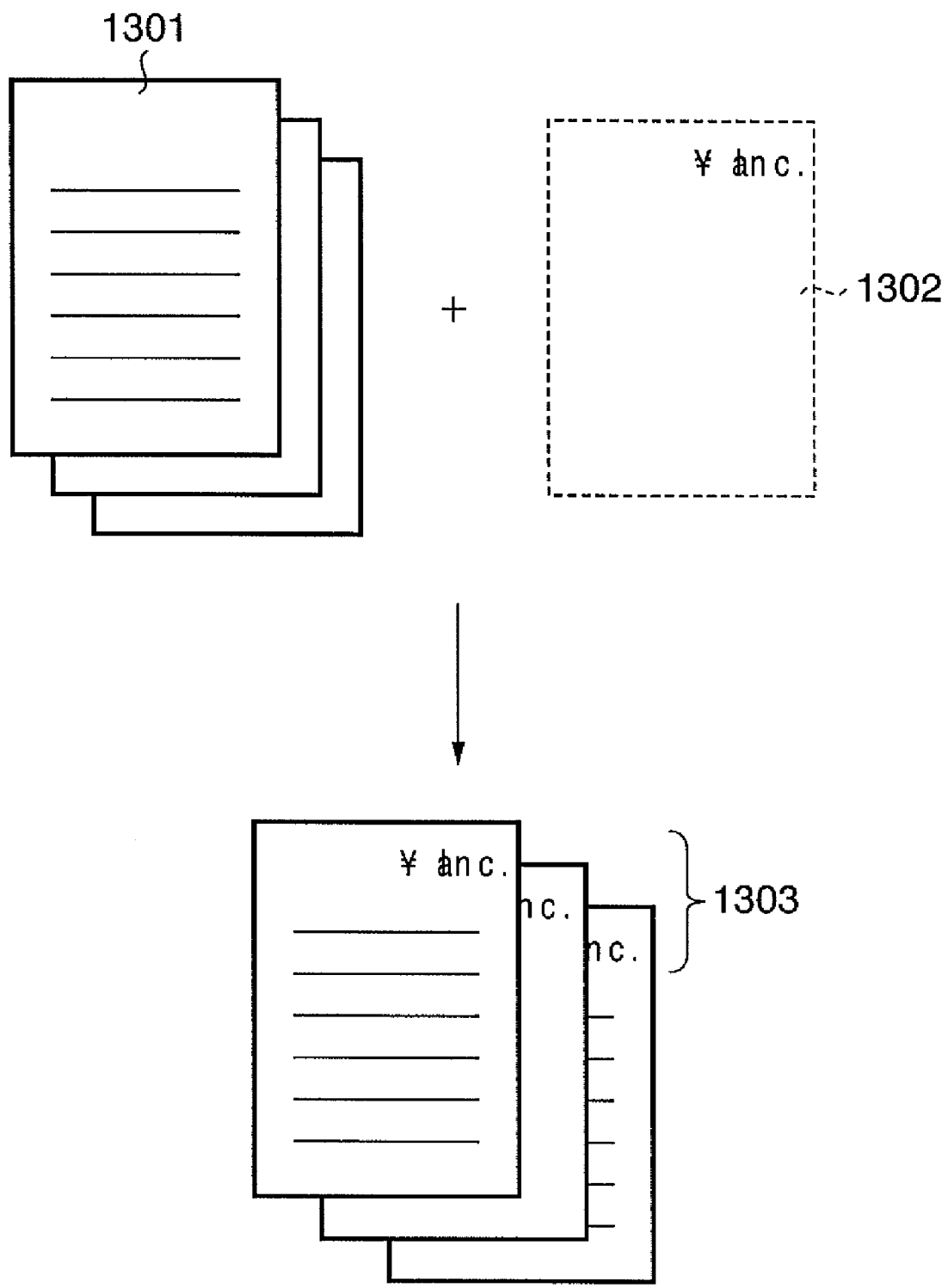
FIG. 13 is a schematic view of spot color form overprinting according to a first embodiment.

FIG. 13 is a schematic view of spot color form overprinting according to a first embodiment. As shown in FIG. 13, a print image 1301 and a spot color form image (company logo) 1302 are synthesized, and an overprinting company logo portion 1303 is printed using spot color toner.

However, if a spot color form image is not selected (No in S1106), the form printing application 223 reads out a form image from the form image storage area 902 (S1107) and performs normal form overprinting (S1110).

According to the first embodiment, using the image forming apparatus as described thus far, a user can easily carry out printing using spot color toner.

Second Embodiment

Next, a second embodiment according to the present invention shall be described in detail with reference to the drawings. Overprinting of various spot color form images shall be described as the second embodiment, with reference to FIGS. 14 through 16.

Note that the descriptions of the second embodiment assume that an MFP 100 is used as the image forming apparatus, in the same manner as the first embodiment.

The second embodiment changes the overprinting processing in S1110 in accordance with the spot color form image, print image, and so on selected in the form overprinting processing indicated by S1105 in FIG. 11 and described in the first embodiment.

Figure 14:
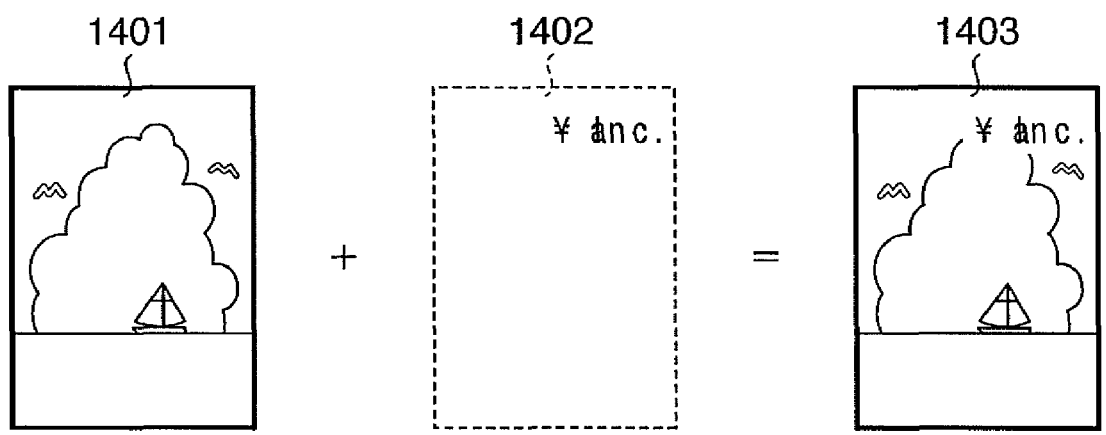
FIG. 14 is a diagram illustrating a result of form overprinting when a spot color form image is overprinted on a print image.

FIG. 14 is a diagram illustrating a result of form overprinting when a spot color form image is overprinted on a print image. FIG. 14 illustrates a company's logo image, where 1401 represents a print image and 1402 represents a spot color form image. When performing overprinting with this form image, it is preferable to use only corporate color toner for the company logo portion of the image.

However, in the case where the spot color form image 1402 and the print image 1401 overlap one another, the corporate colors and print image colors blend together, thus making it impossible to recreate the true corporate color.

Accordingly, in this example, the area of the print image 1401 that overlaps with the spot color form image 1402, which represents the company logo, is clipped. This results in the company logo image being printed using only the spot color toner, as indicated by 1403.

Figure 15:
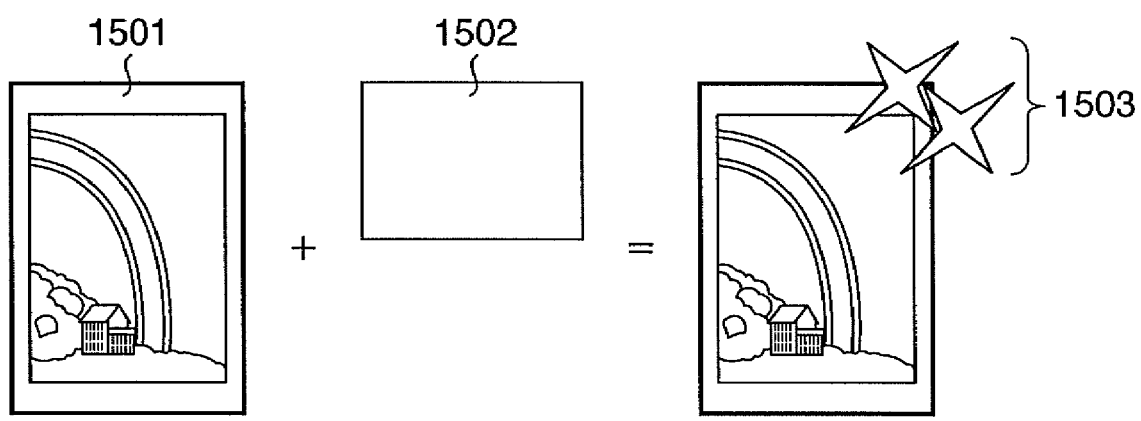
FIG. 15 is a diagram illustrating a result of form overprinting when the spot color form image uses glossy toner.

FIG. 15 is a diagram illustrating a result of form overprinting when the spot color form image uses glossy toner. A sense of texture can be obtained in the print by overprinting glossy toner on a print image 1501; this is represented by 1503 in FIG. 15. It should be noted that in this example, a spot color form image 1502 is overprinted on the entire surface of the print sheet used for the print image 1501, regardless of the size of the spot color form image 1502 itself. This makes it possible for print texture to be obtained across the entire sheet, rather than just on the spot color form image portion.

Figure 16:
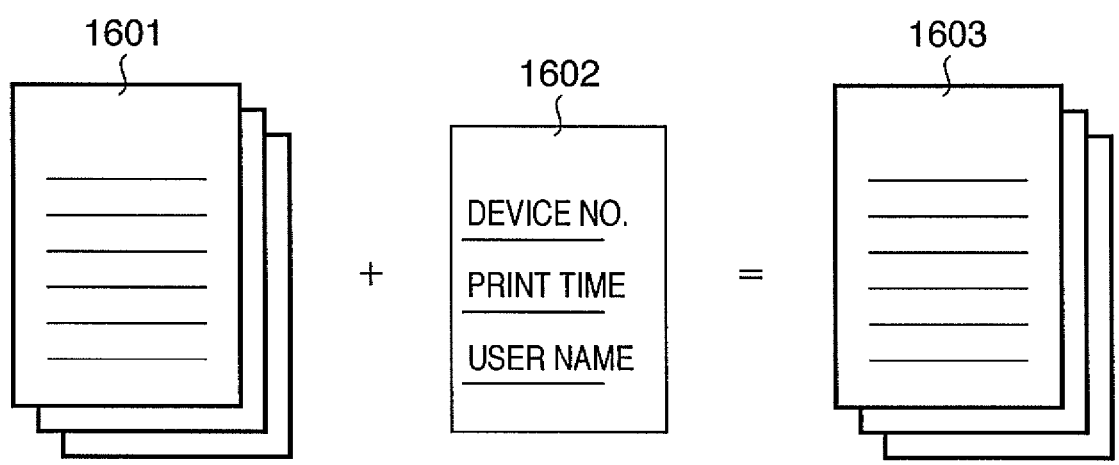
FIG. 16 is a diagram illustrating a result of form overprinting when the spot color form image is for transparent toner.

FIG. 16 is a diagram illustrating a result of form overprinting when the spot color form image is for transparent toner. In this example, when a form image using transparent toner is selected, the spot color form printing expansion application 224 automatically adds printing information, such as the device number of the MFP 100, the print time, the user name, and so on to a spot color form image 1602. The spot color form image 1602 is then synthesized with a print image 1601, and the resultant is printed.

As a result, the print information added to the spot color form image 1602 is printed using transparent toner, and thus does not directly affect the image in the printed output. The added print information can be read by applying a special light to which the transparent toner is responsive. This embodiment is thus useful as a means for increasing security.

The second embodiment thus adds to the effects of the first embodiment, making it possible to overprint various spot color form images.

Third Embodiment

Next, a third embodiment according to the present invention shall be described in detail with reference to the drawings. In the third embodiment, a plurality of types of spot color form images to be overprinted using spot color toner are registered in advance.

Note that the descriptions of the third embodiment also assume that an MFP 100 is used as the image forming apparatus, in the same manner as the first embodiment.

Spot color form image registration processing performed according to the third embodiment shall be described with reference to FIGS. 17 and 18.

In the third embodiment, in S709, the spot color form registration expansion application 214 registers, in advance, a plurality of spot color form images optimized for spot color toner in the spot color form image dedicated storage area 901. Then, a user selects a single spot color form image from the plurality of already-registered spot color form images, and carries out overprinting.

FIG. 17 is a diagram illustrating a form image selection screen used when spot color toner of a corporate color has been detected. Because spot color toners for corporate colors are frequently used when overprinting spot color forms (company logos), form overprinting images are registered, in advance, for a plurality of types of company logos. As shown in FIG. 17, a spot color form image is selected from a plurality of company logos, and overprinting of the spot color form image is then carried out.

FIG. 18 is a diagram illustrating a form image selection screen used when glossy spot color toner has been detected. As mentioned above, overprinting glossy toner has the effect of improving the texture of the outputted result. However, it is necessary to control the amount of glossy toner applied depending on the properties of the sheet to be printed.

Accordingly, when glossy toner is detected, a plurality of types of glossy-type form overprinting images, for each of which the amount of glossy toner to be applied is different, are registered, and the selected glossy-type form image is overprinted.

The third embodiment thus adds to the effects of the first embodiment, making it possible to overprint according to the user's preferences.

Fourth Embodiment

Next, a fourth embodiment according to the present invention shall be described in detail with reference to the drawings. In the fourth embodiment, it is determined, prior to S1102 of the form overprinting processing indicated in FIG. 11 and described in the first embodiment, whether or not a user is authorized to overprint spot color forms.

Note that the descriptions of the fourth embodiment also assume that an MFP 100 is used as the image forming apparatus, in the same manner as the first embodiment.

Figure 19:
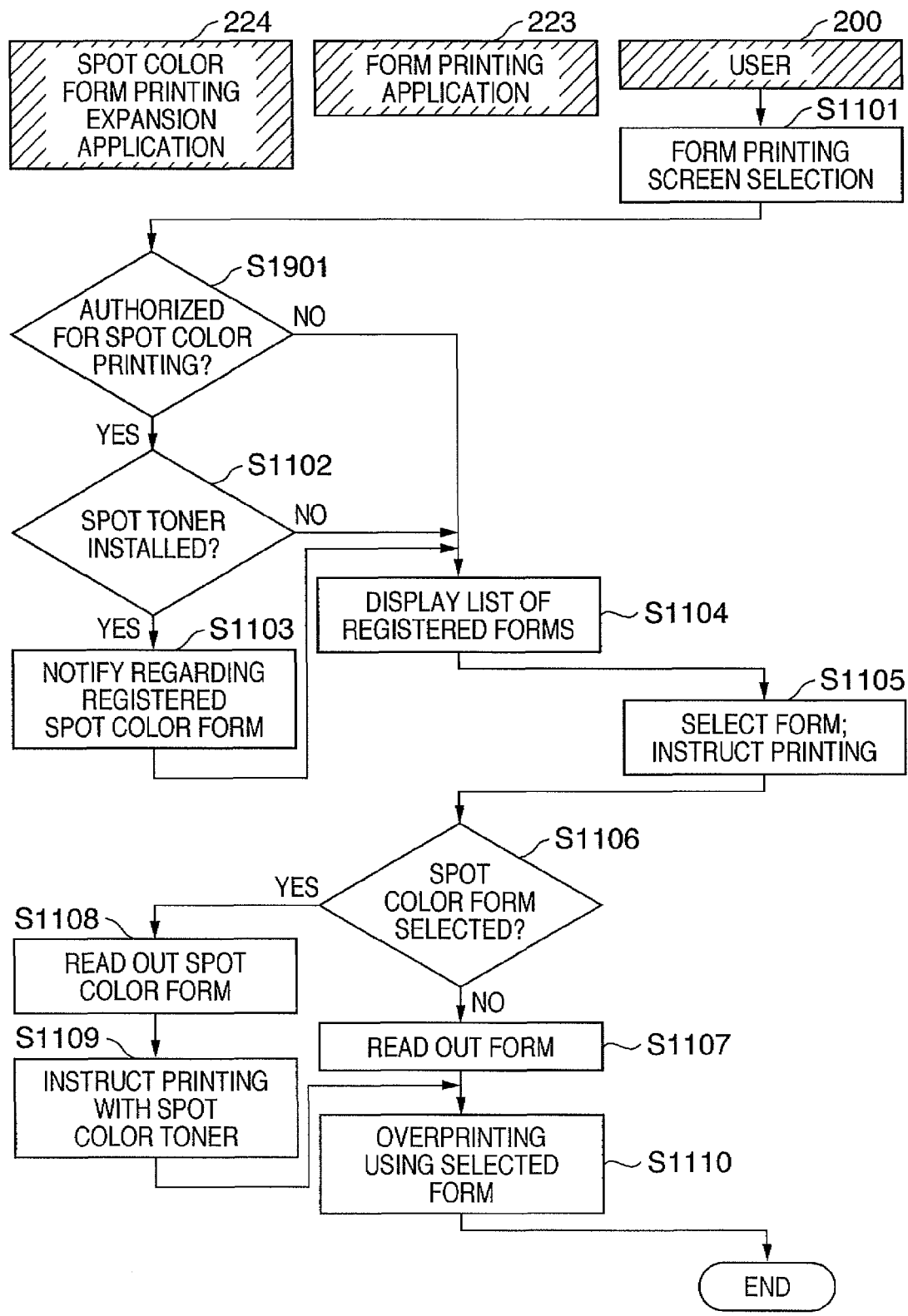
FIG. 19 is a flowchart illustrating a process for performing overprinting of a spot color form image or a normal form image according to a fourth embodiment.

FIG. 19 is a flowchart illustrating a process for performing overprinting of a spot color form image or a normal form image according to a fourth embodiment. Here, S1101 to S1110 in FIG. 19 have the same processing as S1101 to S1110 shown in FIG. 11 and described in the first embodiment.

First, after the user 200 presses the user mode key 508 on the console unit 108 of the MFP 100, s/he operates the touch panel unit 401, and selects the form overprinting screen 1201 for form overprinting.

Based on this selection, the spot color form printing expansion application 214 determines whether or not the user 200 is authorized to perform spot color printing (S1901). The determination as to whether or not the user 200 is authorized to perform spot color printing is based on user login information obtained when the user logs in to the MFP 100.

Figure 20:
FIG. 20 is a diagram illustrating an example of a screen used when a user logs in to a system.

FIG. 20 is a diagram illustrating an example of a screen used when a user logs in to a system. Upon commencing use of the MFP 100, the user inputs a pre-allocated department ID and passkey into boxes 2002 and 2003, respectively, of this screen 2001. This makes it possible for the MFP 100 to identify which user the current user is and to limit functionality.

Next, the spot color form printing expansion application 224 checks the user's spot color printing authorization. The procedure moves to S1102 if the user is authorized and moves to S1104 if the user is not authorized. The procedures occurring thereafter are similar to those explained in the first embodiment and thus explanations thereof shall be omitted.

According to the fourth embodiment, spot color form overprinting functions only for authorized users, making it possible to prevent indiscriminate use of spot color toner, which is a comparatively expensive item.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiments has been stored, and causing a computer (CPU or MPU) of the system or apparatus to read out and execute the program code stored in the storage medium.

In such a case, the program code itself read out from the storage medium implements the functionality of the aforementioned embodiments, and the storage medium in which the program code is stored composes the present embodiment.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the expansion board or expansion unit performs all or part of the actual processing based on instructions included in the program code, and the functions of the aforementioned embodiment may be implemented through that processing. It goes without saying that this also falls within the scope of the present invention.

According to the present invention, it is possible for a user to carry out image forming with ease through an expansion function that uses a specific toner, thereby making it possible to improve the convenience for the user.

Although preferred embodiments of the present invention has been described herein, the present invention is not intended to be limited by the above embodiments in any way; many variations on the present invention are possible within the scope of the invention as described in the following claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-000787, filed Jan. 5, 2007, which is hereby incorporated by reference herein in its entirety.

What is claimed is:

1. An image forming apparatus including a form application and an application platform installed in an operating system, the application platform being a control program that allows the form application to operate, and the apparatus comprising:
   an acquisition unit adapted to acquire a type of consumable material possessed by the image forming apparatus using a library provided in the application platform;
   a display control unit adapted to display forms capable of printing using the type of consumable material acquired by the acquisition unit;
   a designation unit adapted to designate one or more forms from among the forms displayed by the display control unit;
   an image forming unit adapted to form an image using the one or more forms designated by the designation unit; and
   a detection unit adapted to detect whether or not toner, serving as the consumable material, is installed,
   wherein the display control unit displays a screen that expands image forming functionality based on a result of detection by the detection unit, and the image forming unit forms the image using the toner based on an instruction received via the screen, and
   wherein forms which are candidates for selection are determined in accordance with the result of detection by the detection unit.

2. The apparatus according to claim 1, wherein the toner is spot color toner, and the image forming unit synthesizes the form using the spot color toner and clips an image overlapped with the image produced using the spot color toner.

3. The apparatus according to claim 1, wherein the toner is glossy toner, and the image forming unit synthesizes the form using the glossy toner and applies the synthesis created using the glossy toner to the entirety of the sheet on which the image is formed.

4. The apparatus according to claim 1, wherein the toner is transparent toner, and the image forming unit synthesizes the form using the transparent toner and adds information related to the image forming to the synthesized image created using the transparent toner.

5. The apparatus according to claim 1, wherein a plurality of form images in which the toner is applied is stored in advance in a storage unit.

6. The apparatus according to claim 1, further comprising a unit adapted to control usage of the functionality realized by the image forming unit,
   wherein the usage is limited to cases where a predetermined user had logged in.

7. A method for an image forming apparatus including a form application and an application platform installed in an operating system, the application platform being a control program that allows the form application to operate, and the method comprising:
   acquiring a type of consumable material possessed by the image forming apparatus using a library provided in the application platform;
   displaying forms capable of printing using the type of consumable material acquired in the acquiring step;
   designating one or more forms from among the forms displayed in the displaying step;
   forming an image using the one or more forms designated in the designating step; and
   detecting whether or not toner, serving as the consumable material, is installed,
   wherein in the displaying step, a screen that expands image forming functionality is displayed based on a result of detection in the detecting step, and in the forming step, the image is formed using the toner based on an instruction received via the screen, and
   wherein forms which are candidates for selection are determined in accordance with the result of detection in the detecting step.

8. The method according to claim 7, wherein the toner is spot color toner, and in the forming step, the form is synthesized using the spot color toner and an image overlapped with the image produced using the spot color toner are clipped.

9. The method according to claim 7, wherein the toner is glossy toner, and in the forming step, the form is synthesized using the glossy toner and the synthesis created using the glossy toner is applied to the entirety of the sheet on which the image is formed.

10. The method according to claim 7, wherein the toner is transparent toner, and in the forming step, the form is synthesized using the transparent toner and information related to the image forming is added to the synthesized image created using the transparent toner.

11. The method according to claim 7, wherein a plurality of form images in which the toner is applied is stored in advance in a storage unit.

12. The method according to claim 7, further comprising controlling usage of the functionality realized,
   wherein the usage is limited to cases where a predetermined user had logged in.

13. A non-transitory computer-readable storage medium on which is stored a program causing an image forming apparatus to execute the method according to claim 7.

* * * * *